United States Patent [19]

Yabu

[11] Patent Number: 5,200,592
[45] Date of Patent: Apr. 6, 1993

[54] AUTOMATIC CUTTING APPARATUS FOR CLOTH

[75] Inventor: Masaaki Yabu, Tokyo, Japan

[73] Assignee: Juki Corporation, Tokyo, Japan

[21] Appl. No.: 770,538

[22] Filed: Oct. 3, 1991

[30] Foreign Application Priority Data

Oct. 4, 1990 [JP]  Japan .................................. 2-267134

[51] Int. Cl.⁵ ............................................ B23K 26/00
[52] U.S. Cl. ............................ 219/121.67; 219/121.82
[58] Field of Search ...................... 219/121.67, 121.72, 219/121.82; 83/276

[56] References Cited

U.S. PATENT DOCUMENTS

| | | | |
|---|---|---|---|
| 4,672,172 | 6/1987 | Pearl | 219/121.67 |
| 4,675,497 | 6/1987 | Pearl et al. | 219/121.67 |
| 4,740,668 | 4/1988 | Perez | 219/121.67 X |

*Primary Examiner*—C. L. Albritton
*Attorney, Agent, or Firm*—Morgan & Finnegan

[57] ABSTRACT

An automatic cutting apparatus for cloths is able to designate relevant cloth and so cut the cloth with a laser beam according to characteristics of the cloth under the optimum condition. According to the cutting apparatus, the cloth may be cut by automatically setting the optimum cutting condition upon designating the type of the cloth to be cut.

9 Claims, 6 Drawing Sheets

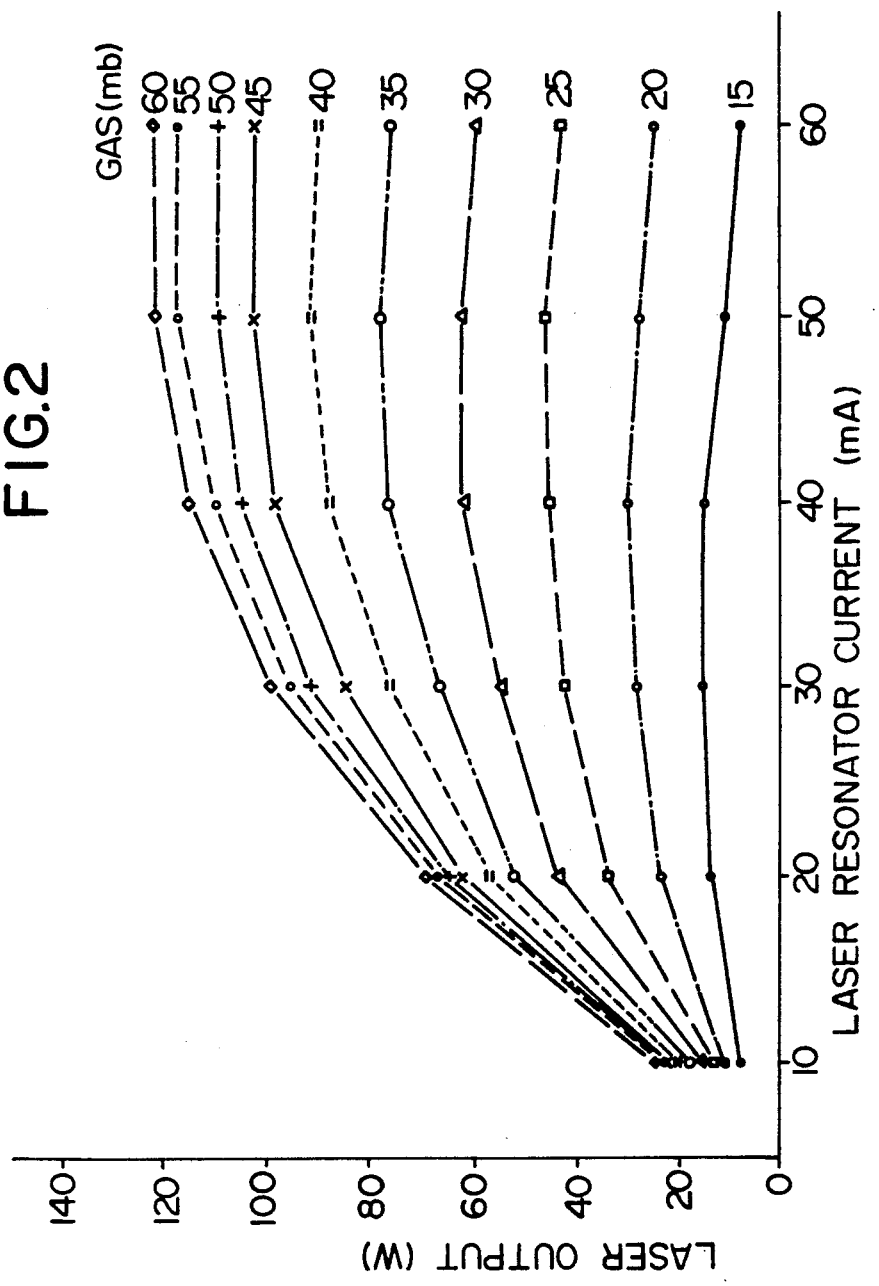

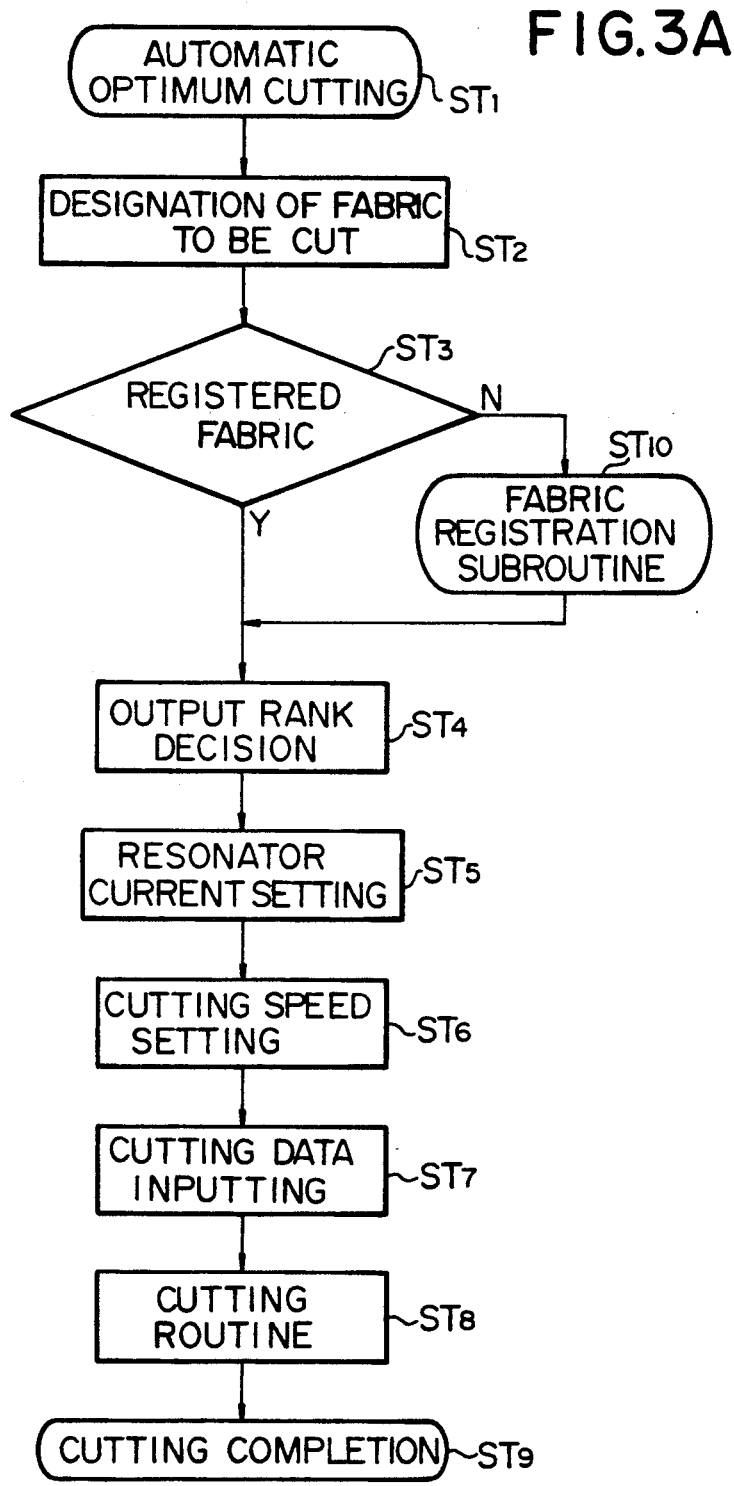

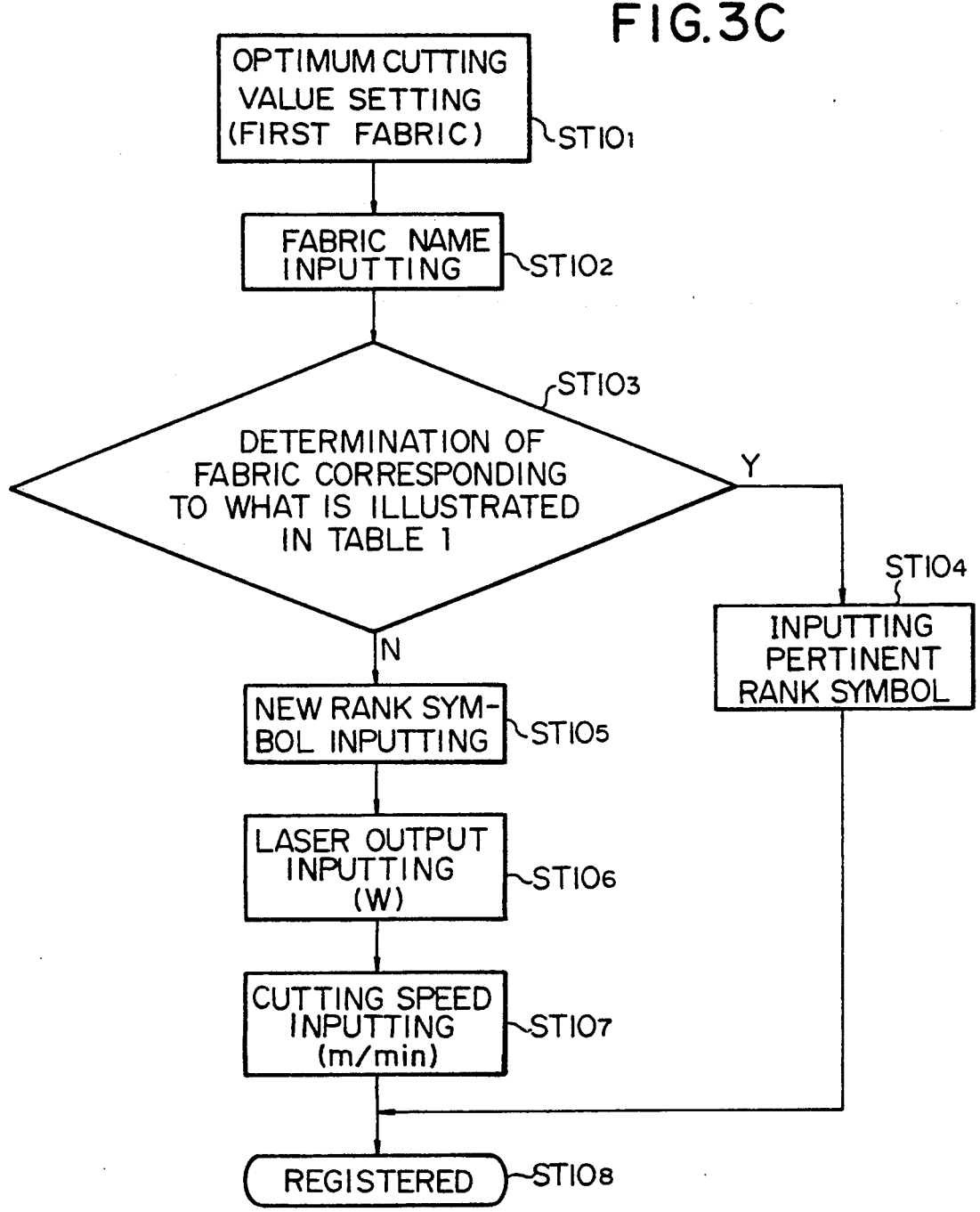

AUTOMATIC CUTTING APPARATUS FOR CLOTH

BACKGROUND OF THE INVENTION

This invention relates to an automatic cutting apparatus for cutting materials such as fabric and cloth and the like with a laser beam, and more particularly, to an automatic cloth cutter which is capable of modifying cutting conditions so as to accommodate characteristics such as thickness and the like of material.

A conventional automatic cloth cutter 1 for cutting material with a laser beam, as shown in FIG. 4, has previously been designed to comprise therein a generator 2 such as a laser resonator for outputting or projecting a laser beam 2a, a plurality of mirrors 3a, 3b, 3c, and 3d through which the laser beam 2a passes, and a cutting head 4 to which the beam 2a is led. The cutting head 4 is provided in the interior thereof with a laser beam reduction lens 4a which is adapted to reduce the spot diameter of the laser beam 2a led to the cutting head 4.

The cloth cutter 1 is formed at its top surface 5 and its opposite sides with a pair of shafts 6a, 6b disposed in parallel with each other, and another shaft 7 slidably supported between the shafts 6a and 6b. The cutting head 4 is so mounted on the shaft 5 as to move on the top surface 5 in the X or Y direction and in parallel with the shafts 6a, 6b or the shaft 7 by means of a carrier or transfer means (not shown).

A control means (not shown) is incorporated in the cutter 1 for providing various controls and includes a control panel 8 connected to the control means. The control panel 8 is adapted to operate a switch element 8a on the top surface to transmit a control signal to the control means for controlling the control means, thereby transferring the cutting head 4 in the X or Y direction. The cloth (not shown) to be cut is laid on the top surface 5 of the cutter 1 and then cut in the desired dimension or shape by operating the control panel 8 with the generator 2 or laser resonator into the "on" position to transfer the laser resonator 2 in the X or Y direction.

However, disadvantages derived from such conventional automated cloth cutting apparatus that intensity of the laser output of the laser beam 2a from the laser resonator 2 and transferring speed (cutting speed) of the cutting head 4 are invaluable to render its value substantially constant, are discussed hereinafter.

More specifically, cloths for use in making the apparel are formed of natural fiber, chemical fiber, synthetic fiber, and fiber composed thereof or the like and are of different thickness according to seasons even if they are made of the same material. For this reason, when the cloth is so cut under optimum conditions as to accommodate it to the nature of material, more the cutting apparatuses are required to fulfill the respective conditions to thus not only entail more cost but also involve more space.

Consequently, for the purpose of cutting all the cloths with one cutter, the cutter is arranged to provide cutting capability to meet the nature of the cloth under the critical conditions. However, if the cutter is provided with such cutting capability suited to the cloth under the critical condition, this cutter is suitable for cutting thicker cloths such as 14 oz. denim, and wool and the like for an overcoat. In contrast, if a cutter of this class is used for cutting light cloth or cloth of chemical fiber unresistant to heat, this will waste much energy to this end and wear the top surface (cutting panel) of the cutter or will melt and stick the cut cloth to the panel and involve unevenness of quality of the cloth surface as cut.

It is therefore an object of the invention to provide an automated cloth cutting apparatus capable of ensuring cutting of the cloth in a suitable manner.

Another object of the invention is to provide an automated cloth cutting apparatus which is able to cut the cloth in a preferred condition to match the characteristics of the cloth.

An advantage of the invention is that laser output and/or speed may be set by only one cutting apparatus under the optimum cutting conditions according to characteristics such as a weight and a thickness and the like of a material for the cloth as available so that energy may not be wasted and the cut cloth of high quality and at high cutting efficiency may be obtained.

A further advantage of the invention is that the cutting apparatus is capable of minimizing wear and damage on the surface, thereby assuring the apparatus long operating life without no ill effect to the laser beam.

SUMMARY OF THE INVENTION

These and other objects of the invention are met by providing an automated cloth cutting apparatus which comprises a generator such as a laser resonator and the like for outputting a laser beam, a cutting head adapted to reduce the laser beam outputted therefrom for irradiating the reduced laser beam to the cloth, cutting the latter, and transfer means for transferring the cutting head and the cloth relative to each other. The automated cloth cutting apparatus is characterized by provision of control means for varying at least either one of the output intensity of the laser resonator and the transfer speed of the transfer means.

In preferred embodiments, the invention provides control means for changing at least either one of an output intensity and a relative transfer speed of the cutting head relative to the cloth to sets the optimum cutting conditions suitable to the cloth as available.

BRIEF DESCRIPTION OF THE DRAWINGS

The invention will be described in greater detail below by way of reference to the accompanying drawings, in which:

FIG. 2 is a graph in which the relation between a laser output and current supplied to a laser resonator is plotted with gas pressure (GAS) shown as a parameter being made constant;

FIGS. 3A through 3D are flow charts for actuating the instant cutter; and

DETAILED DESCRIPTION OF THE INVENTION

Figure 4:
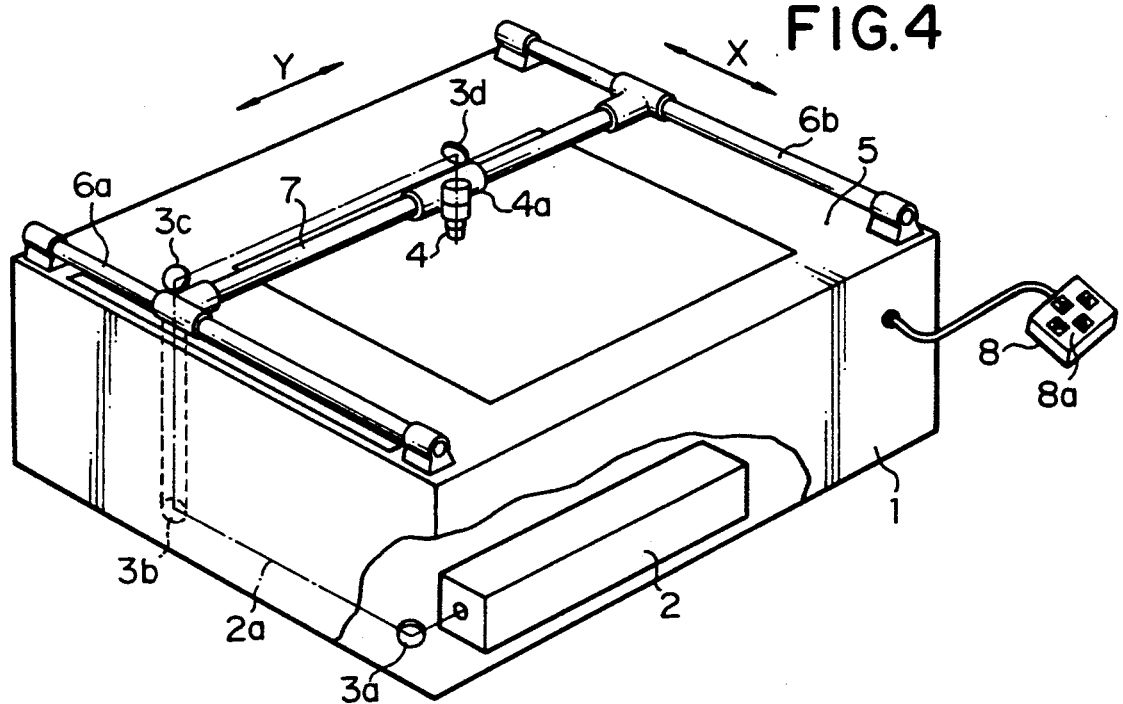
FIG. 4 is a perspective view schematically showing a conventional automatic cutting apparatus.

Throughout the several views, like reference characters or numbers used in FIG. 4 designate like or corresponding parts.

Figure 1:
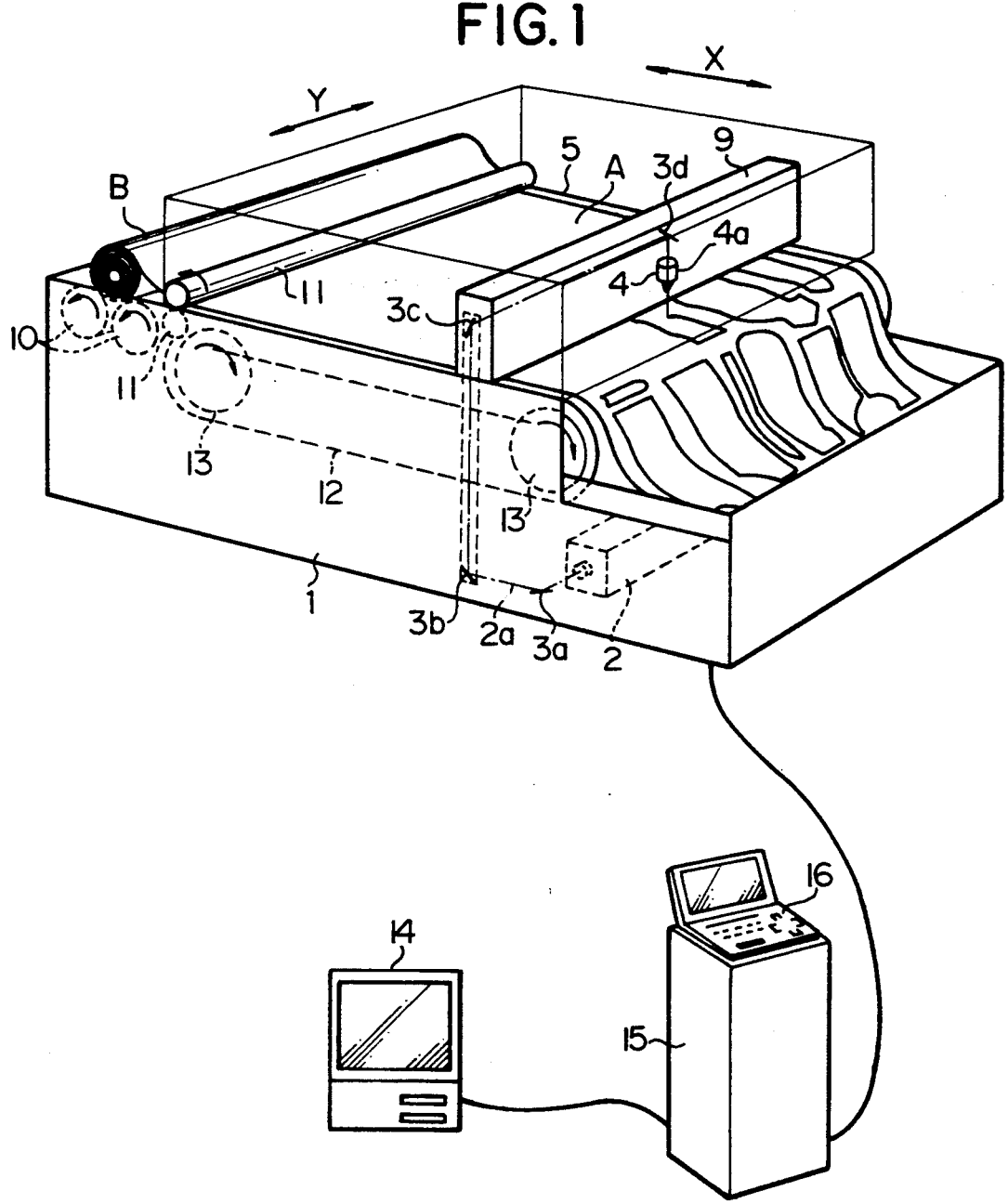
FIG. 1 is a perspective view schematically showing an automatic cutting apparatus in full length embodying the present invention.

Referring to FIG. 1, numeral 2 denotes a generator or laser resonator which is in a form of a $CO_2$ gas resonator that is normally used due to output intensity required for cloth cutting. A laser beam 2a outputted from the laser resonator 2 is led through a plurality of mirrors 3a, 3b, 3c, and 3d to a cutting head 4 in which a lens 4a is incorporated. The laser beam 2a led to the cutting head 4 is reduced by the lens 4a to the extent of a spot diameter suitable for cutting.

The cutting head 4 is movably mounted in a head accommodating housing 9 extending in a Y direction. Means for transferring the cutting head 4 may be in a form of a drive and driven pulley assembly which is arranged so that a wire is fixed to the cutting head 4 and trained between a drive pulley and a driven pulley disposed at either end of the housing. The cutting head is thus moved by forwardly and reversely moving the drive pulley through a stepping motor. The housing 9 is also moved with the cutting head 4 in a X direction intersecting with the Y direction in a plane by the stepping motor (not shown).

The cutter 1 is provided on its top surface 5 with a pair of spreader rollers 10, 10 which are rotated in the same direction to unroll a cloth A from a roll of the cloth while cutting the same. Each of the rollers 10, 10 is rotated (counterclockwise direction in FIG. 1) by drive means (not shown) in the direction of unrolling the cloth A from the roll B. A pair of feed rollers 11, 11 are disposed adjacent the spreader rollers 10, 10 to clamp and feed the cloth A unrolled from the roll B in the X direction. These feed rollers 11 are rotated by a stepping motor (not shown). An endless belt conveyor 12 is extended over the greater part of the top surface 5 of the cutter 1 to carry and convey the cloth a fed by the feed rollers 11, 11. The belt conveyor 12 is trained between conveyor driving wheels 13, 13. Any of the wheels 13, 13 is rotated by a stepping motor (not shown) to carry the cloth A to a cutting station corresponding to an area of movement of the housing 9.

A user system 14 is provided for inputting data on the raw material, thickness thereof and so on and is connected by a controller box 15 to the cutter 1. The control box 15 functions as a control element and serves to output a control signal adapted for controlling the output intensity of the laser resonator 2 according to the data inputted to the user system 14, driving frequency of the stepping motor for driving the conveyor driving wheels 13, 13, the transfer direction and speed each of the cutting head 4 and the housing 9. This control signal is stored in the form of a plurality of patterns in the control box 15 and is outputted in response to the input data from the user system 14. It is, however, noted that the input data may be inputted by directly operating an operating panel 16 mounted on the top of the control box 15 without using the user system 14.

As is apparent from the graph of FIG. 2, the output of the laser resonator 2 may be adjusted in such a manner that a suitable supply current is drained to the resonator 2 by the control signal from the control box 15 in response to input data since an appropriate laser output may be obtained by changing the supply current applied to the laser resonator 2 with the laser gas pressure constant.

A relative transfer speed (cutting speed) of the cutting speed and the cloth may be readily achieved by changing a driving frequency of a stepping motor (not shown). More specifically, the cutting speed in the X, Y directions, that is, the transfer speeds of the housing 9 and the cutting head 4, may be set to the desired speed by changing the driving sequences of the respective stepping motors.

Table 1 which is later referred to shows the optimum conditions of the laser output to the various cloths and of the cutting speed when the spot diameter of the laser beam is made constant. As is evident from Table 1, the laser output and the cutting speed vary in the optimum condition of the laser output and the cutting speed depending upon the types of the cloths. More specifically, the heaviest cloth is required to provide more laser output and lower cutting speed due to difficulty in cutting it whereas the lightest cloth is required to have lower laser output and more cutting speed. For this reason, the control signal outputted from the control box 15 may be set to six patterns as shown in Table 1. The control box 15 incorporates therein six tables which are arranged to set cutting conditions corresponding to the six patterns. At the control panel 16 or the like, when the cloths are selected by depressing a button which indicates the cloth to be used, the data for the table in a condition suitable to cut the cloth are selected so that cutting may be controlled by the control signal for the data.

Operation of the instant apparatus arranged as aforementioned will be described with reference to a flow chart of FIG. 3.

FIG. 3A shows main routines of cutting made by the automatic cutter. Selection of automatic optimum cutting (Step $ST_1$) is required to designate the cloth to be cut (Step $ST_2$). If the designated cloth has been already registered (Step $ST_3$), the control flow goes to Step $ST_4$ to select the table corresponding to the registered cloth from among the six tables, determining the output rank.

Figure 3B:
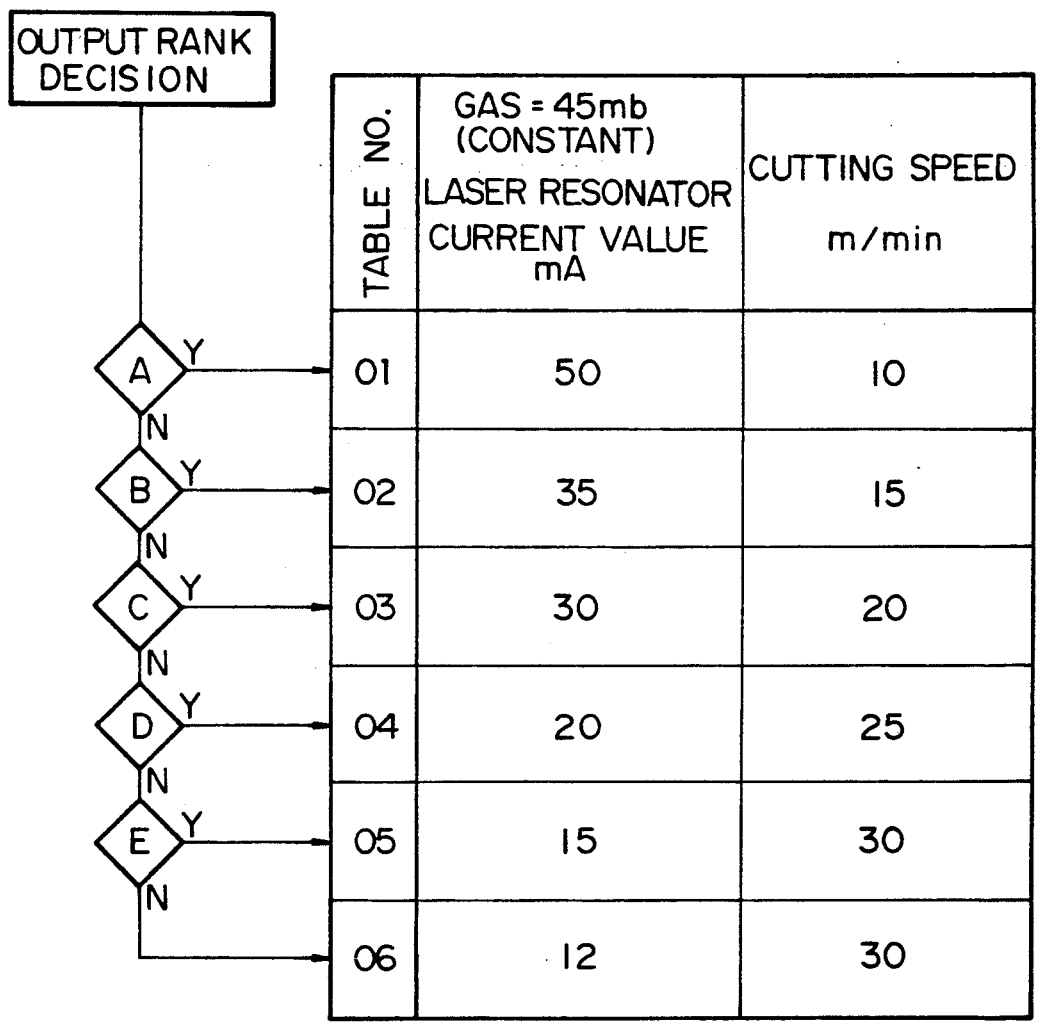

FIG. 3B shows subroutines which are prepared by specifying the output rank decision where decision as to whether the cloth corresponds to a table 01 is made. If so, the current value of the laser resonator and the cutting speed to which the table 01 corresponds are selected. If there is no cloth which correspond to the table 01, whether the cloth corresponds to a table 02 is determined. In this manner, any of the tables 01–06 is selected, each of which corresponds to the cloth to be used. When any of the tables 01–06 is selected, the control flow goes to Step $ST_5$ of FIG. 3A to set the current of the laser resonator 2 corresponding to the table as set and Step $ST_6$ is implemented to set the cutting speed corresponding to the set table.

Then control flow goes to Step $ST_7$ to input a configuration of the pattern to be cut, in which the actual cutting is made in Step $ST_8$ in the manner as referred to in FIG. 1 by pushing the button or the like to this end. The control flow goes to Step $ST_9$ when the cutting is completed.

In this connection, it is noted that if the cloth is not registered when it is designated, the cloth to be registered is so determined in Step $ST_3$ as to have the control flow advanced to the cloth registration subroutine in Step $ST_{10}$.

As shown in FIG. 3C, the cloth registration subroutine is implemented to set the optimum cutting value for the first cloth provided in Step $ST10_1$. Step $ST10_2$ in which the name of the fabric is registered is followed by Step $ST10_3$ where whether the cloth corresponding to the rank set by the item shown in TABLE 1 is represented or not is determined. If so, the control flow advances to Step $ST10_4$ in which the symbol of the relevant rank is inputted. Step $ST10_4$ is followed by Step $ST10_8$ while skipping Steps $ST10_5$, $ST10_6$, and $ST10_7$ to complete the registration.

On the other hand, a negative decision (NO) is obtained in Step $ST10_3$, and the control flow goes to Step $ST10_5$ in which a new symbol of the rank is inputted. Steps $ST10_6$ and $ST10_7$ are implemented to input the laser output and the cutting speed, completing the registration upon advance toward Step $ST10_6$.

Figure 3D:
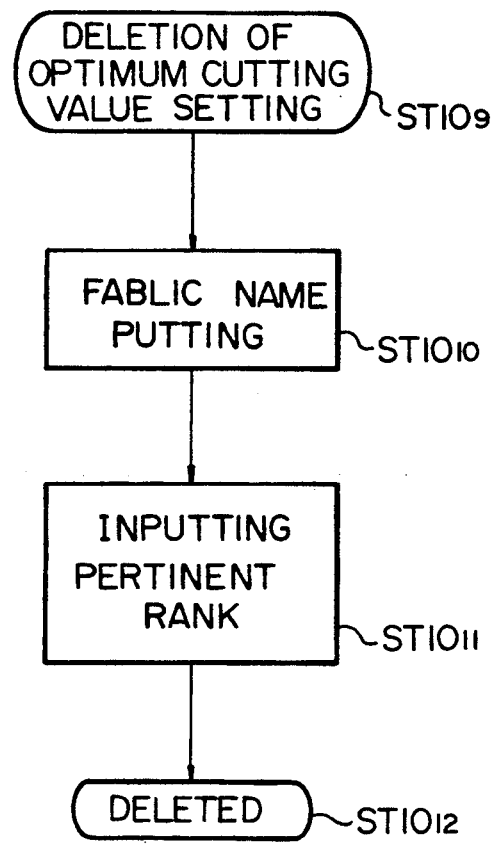

In case of an erroneous optimum cutting value being inadvertently set, Step $ST10_9$ is implemented to delete the optimum cutting value setting as shown in FIG. 3D. This subroutine is followed by Step $ST10_{10}$ in which the cloth erroneously set is inputted and then by Step $ST10_{11}$ in which the rank which has been already set is inputted so that the pre-set rank is deleted to complete deletion in Step $ST10_{12}$.

Although the invention has been described in detail herein by way of reference to the preferred embodiments, it should be understood that the invention is not limited to the disclosed embodiments but should be interpreted in accordance within the claims which follow.

TABLE 1

Optimum Cutting Parameter for Various Cloths

| NO. | Thickness | Laser Output (w) | Fixed Spot Dia. (mm) | Cutting Speed (m/min) | Fabric |
| --- | --- | --- | --- | --- | --- |
| 01 | Heaviest | 100 | 0.1–0.3 | 10 | 14 oz. denim, vinyl leather, velvet, corduroy (heavy), velours (over coat) |
| 02 | Heavy | 80–100 | 0.1–0.3 | 15 | 10 oz. denim, felt, cashmere, flano, jersey, wool gabardine, cotton suede |
| 30 | Normal | 60–80 | 0.1–0.3 | 20 | velvet, flannel, tricot, mixed wool, wool melton, taffeta, knit good, amunzen |
| 04 | Somewhat light | 40–60 | 0.1–0.3 | 25 | summer wool, broadcloth, double georgette, shirt, blouse, voile, shantung |
| 05 | Light | 20–40 | 0.1–0.3 | 30 | lining cloth, lawn, gingham, chiffon |
| 06 | Lightest | 15–30 | 0.1–0.3 | 30 | georgette, organdy, circular rib knit |

What is claimed is:

1. A cutting apparatus for cloth having plate means for setting said cloth flat, cutting head means having a generator for outputting a laser beam of which intensity corresponds to a value of supply current, said generator being so arranged upwardly of said plate means as to have said laser beam irradiated over said cloth for cutting said cloth on said plate means with said laser beam, and transfer means for moving said cutting head means relative to said plate means for cutting said cloth in a predetermined shape, comprising:

means actuable based on cutting condition of said cloth with said laser beam;

memory means in which are stored said cutting conditions corresponding to the features of the respective cloths;

designating means for selectively generating one of signals indicating respectively said features of said cloths; and means for reading out the cutting condition corresponding to the selected signal from said memory means and setting said cutting condition as read out to feed the latter to said actuating means.

2. A cutting apparatus for cloth according to claim 1, wherein one of said features of said cloth which is registered in and read out from said memory means is a variety of cloth materials.

3. A cutting apparatus for cloth according to claim 1, wherein one of said features of said cloth which is registered in and read out from said memory means is cloth thickness.

4. A cutting apparatus for cloth having plate means for setting said cloth flat, cutting head means having a generator for outputting a laser beam of which intensity corresponds to a value of a supply current, said generator being so arranged upwardly of said plate means as to have said laser beam irradiated over said cloth for cutting said cloth on said plate means with said laser beam, and transfer means for moving said cutting head means relative to said plate means for cutting said cloth in a predetermined shape, comprising:

speed setting means for setting a transfer speed by transfer means;

memory means adapted to store therein the transfer speed of said transfer means;

means for designating the features of said cloth; and means for reading out the corresponding transfer speed from said memory means according to designation of said designating means to set said speed setting means.

5. A cutting apparatus for cloth according to claim 4, wherein one of said features of said cloth which is registered in and read out from said memory means is a variety of cloth materials.

6. A cutting apparatus for cloth according to claim 4, wherein one of said features of said cloth which is registered in and read out from said memory means is cloth thickness.

7. A cutting apparatus for cloth having plate means for setting said cloth flat, cutting means having a generator for outputting a laser beam of which intensity corresponds to a value of a current, said generator being so arranged upwardly of said plate means as to have said laser beam irradiated over said cloth for cutting said cloth on said plate means with said laser beam, and transfer means for moving said cutting head means relative to said plate means for cutting said cloth in a predetermined shape, comprising:

current setting means for setting a value of a supply current to said generator;

memory means in which is stored said value of said supply current to said generator, which correspond to the features of said cloth to be cut; and means for reading out the corresponding value of said supply current from said memory means according to designation of said designating means to set said speed setting means.

8. A cutting apparatus for cloth according to claim 7, wherein one of said features of said cloth which is registered in and read out from said memory means is a variety of cloth materials.

9. A cutting apparatus for cloth according to claim 7, wherein one of said features of said cloth which is registered in and read out from said memory means is cloth thickness.

* * * * *